Figure 1:
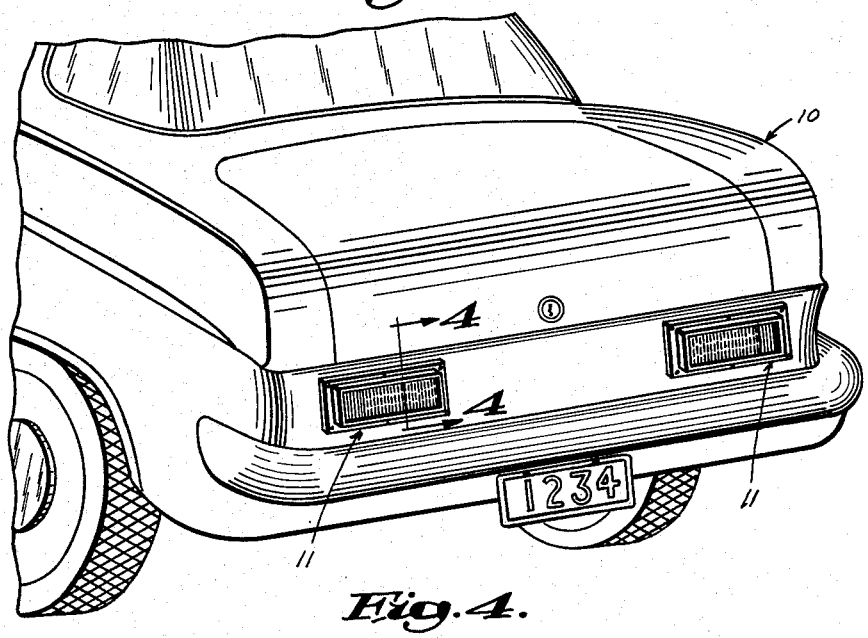

May 18, 1965  C. TATHAM III  3,183,881
STOP LIGHTS PROVIDING VISUAL INDICATIONS
TO THE EXTENT OF BRAKE APPLICATIONS
Filed Feb. 7, 1962  2 Sheets-Sheet 1

Inventor:
Charles Tatham 3rd.
by Abbot Spear
Attorney

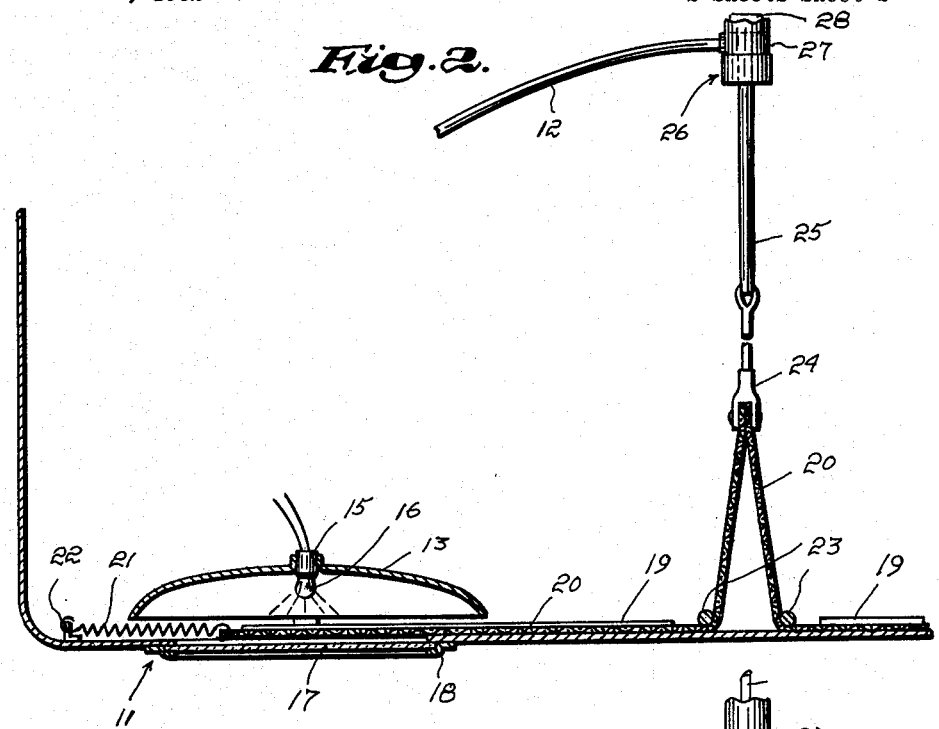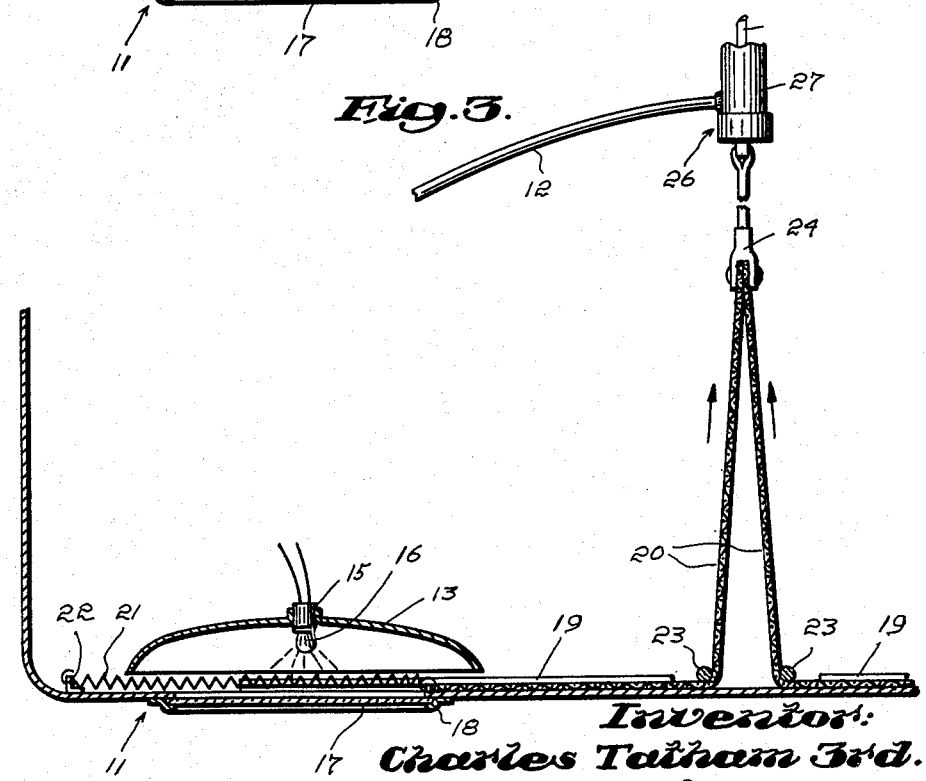

United States Patent Office 3,183,881
Patented May 18, 1965

3,183,881
STOP LIGHTS PROVIDING VISUAL INDICATIONS
TO THE EXTENT OF BRAKE APPLICATIONS
Charles Tatham III, Box 242, Keene, N.H.
Filed Feb. 7, 1962, Ser. No. 171,771
3 Claims. (Cl. 116—42)

The present invention relates to stop lights for vehicles with the stop lights giving visual indications of the extent of brake applications.

While the invention is adapted for use with any vehicle where following traffic presents a risk of rear end collisions, it is herein discussed with particular reference to motor vehicles. Motor vehicles, in modern traffic, are dependent from signals on leading vehicles for the prevention of rear end collisions. The signals presently employed, are reasonably well suited to the requirements of slow moving traffic but do not give sufficient warning to prevent rear end collisions on high speed highways.

A conventional stop light gives a visual indication that the brakes of a vehicle are applied. At slow speeds, whether or not a gradual stop or a quick stop is being made is usually not of any particular importance. On roads on which high speed traffic is encouraged, however, the fact that a leading car has its stop light illuminated may mean that an emergency stop is being made or, at the other extreme, that the driver is merely slowing down somewhat. If the driver of the following car makes the wrong guess as to what the illuminated stop light means, a serious accident may well result.

The principal object of the present invention is to provide stop lights that will give visual indications of the extent of the brake application, thus to give the driver of any following vehicle a definite warning of the extent to which the brakes are applied, for example, whether the leading car is being slowed down somewhat, or whether a sudden stop is being made.

In accordance with the invention, this objective is attained by providing a stop light for a vehicle having conventional brakes and a conventional brake operating system including an operator control, the extent of movement of which is proportional to the extent of brake application. The stop light comprises a reflector, a socket for supporting a lamp within the socket, a translucent cover for the reflector, a shield between the cover and the reflector, means yieldably holding the shield in a first position in which a portion of said reflector is unblocked thereby, and means connected to the brake operating system and connected to the shield for moving it against the action of the yieldable means to decrease the area of the reflector blocked by the shield. With such a stop light, the area of the reflector that is exposed is directly related to the extent of brake application, thus giving the following vehicle or vehicles a definite indication of whether or not the brakes are applied for an emergency stop or otherwise.

In practice, there are usually two stop lights and the means for actuating their shields is preferably common to both. While the invention may be used with mechanical brake operating systems, most systems are either operated by air or liquid under pressure, in which case, the means connected to the system and to the shield or shields is a piston-cylinder unit with the piston connected to the shields and the cylinder in communication with the system to receive air or liquid under pressure therefrom in proportion to the extent of movement of the operator control.

In the accompanying drawings, there is shown an illustrative embodiment of the invention from which these and other of its objectives, novel features, and advantages will be readily apparent.

Figure 4:
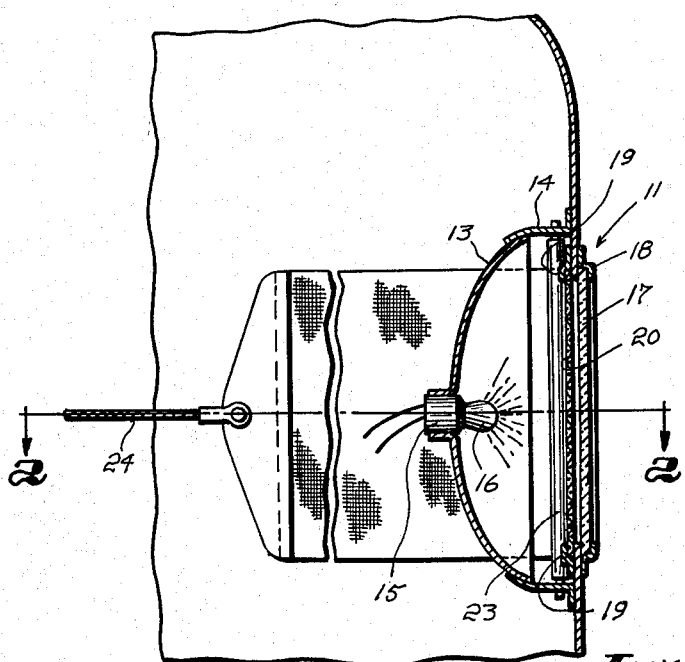

In the drawings,

FIGURE 1 is a fragmentary, rear perspective view of an automobile having stop lights in accordance with the invention, FIGURE 2 is a section taken approximately along the indicated lines 2—2 of FIGURE 4, FIGURE 3 is a similar view but with the parts in the position resulting from the application of the brakes to the maximum extent, and FIGURE 4 is a section taken approximately along the indicated lines 4—4 of FIGURE 1 but on an increased scale.

An automobile is generally indicated at 10 and is shown as having a pair of stop lights which are generally indicated at 11. The automobile is provided with brakes operated by a suitable system including an operator control in the form of a brake pedal. The brake system may be mechanical, or operated by fluid under pressure, either air or liquid, and, as is well known, the extent of brake application is proportional to the extent to which the operator control is depressed. Such systems are not shown in the drawings as they are conventional and well known.

In the typical motor vehicle, the brake system is hydraulic in the case of pleasure vehicles and air operated in commercial vehicles and there is shown a line 12 which is in communication with the system so that fluid under pressure is delivered thereto, whenever the operator control is actuated, in proportion to the actuation of the operator control.

Each stop light 11 consists of a reflector 13 held in a mount 14 and supporting a socket 15 for a lamp 16. Each stop light 11 is also provided with a translucent cover 17 held in place by a frame 18. The covers 17 are usually colored red.

Adjacent the upper and lower edges of each reflector, there are guides 19 for retaining the flexible shield 20. At one of its ends, each shield 20 is shown as connected to a spring 21 having an anchor 22 located adjacent one end of each reflector 13. Adjacent the other end of each reflector 13, there is a vertically disposed guide member 23, preferably a roller, about which the shield is trained and the two shields 20 are locked together to a member 24 attached to the exposed end of a piston stem 25 of a generally indicated piston-cylinder unit 26. The cylinder 27 has the line 12 connected thereto to admit fluid under pressure behind the piston 28 thus to force it in a direction pulling the shields 20, against the action of the springs 21, from their first position.

In the first position of the shields 20, see FIGURE 2, the end of the reflector 13 adjacent the springs 21 is unblocked so that the stop lights 11 normally serve as tail lights. While the shields may be more or less transparent adjacent the springs 21, it is preferred that they terminate short of that end of each reflector. Movement of the piston 28, increases the areas of the reflectors that are unblocked by the shields 20 and such movement is approximately in proportion to the extent of brake application.

While the shields 20 may be translucent and red colored, it is preferred that they be opaque to ensure maximum size and color intensity contrasts as the vehicle brakes are applied.

I claim:

1. A stop light for a vehicle having brakes and a fluid pressure brake operating system including a movable operator control, the extent of movement of which is proportional to the extent of brake application, said stop light comprising a reflector, a socket for supporting a lamp within said socket, a translucent cover for said reflector, a shield between said cover and said reflector, means yieldably holding said shield in a first position in which a portion of said reflector is unblocked thereby, and a piston-cylinder unit, the piston of said unit being connected to said shield for moving it against the action of said yieldable means to decrease the area of the reflector blocked by said shield, and said cylinder being in communication with the system, the piston moving in relation to the extent of brake application.

2. A pair of stop lights for a vehicle having brakes and a fluid pressure brake operating system including a movable operator control, the extent of movement of which is proportional to the extent of brake application, each stop light comprising a reflector, a socket for supporting a lamp within said socket, a translucent cover for said reflector, a shield between said cover and said reflector, means yieldably holding said shield in a first position in which a portion of said reflector is unblocked thereby, and a piston-cylinder unit angularly disposed relative to the planes of said covers, and a flexible connection between each shield, the piston of said unit for moving them against the action of said yieldable means to decrease the area of the reflectors blocked by said shields in relation to the extent of brake application.

3. A stop light for a vehicle having brakes and a brake operating system including a movable operator control, the extent of movement of which is proportional to the extent of brake application, said stop light comprising a reflector, a socket for supporting a lamp within said socket, a translucent cover for said reflector, a flexible shield between said cover and said reflector and extending transversely of said reflector, resilient means adjacent one end of said reflector and attached to one end of said shield and yieldably holding said shield in a first position in which an end portion of said reflector is unblocked thereby, guide means for said shield including transverse guides adjacent the top and bottom of said reflector and a member adjacent the other end of said reflector about which said shield is trained, means connected to said system and to the other end of said shield for moving it against the action of said yieldable means to decrease the area of the reflector blocked by said shield in relation to the extent of the brake application.

References Cited by the Examiner
UNITED STATES PATENTS

| | | | |
|---|---|---|---|
| 1,134,104 | 4/15 | Burgess | 116—42 |
| 1,390,573 | 9/21 | McKesky | 116—43 |
| 1,455,422 | 5/23 | Boitnott | 340—67 |
| 1,774,801 | 9/30 | Macke et al. | 340—263 X |
| 1,784,884 | 12/30 | Smith | 340—262 X |
| 2,474,610 | 6/49 | Wunch | 340—263 X |
| 2,946,042 | 7/60 | Beasley | 340—263 X |

LOUIS J. CAPOZI, *Primary Eaminer.*

NEIL C. REID, *Examiner.*